June 3, 1969   W. KOZIOL   3,447,445
SPIT ROD ASSEMBLY
Filed Dec. 21, 1966
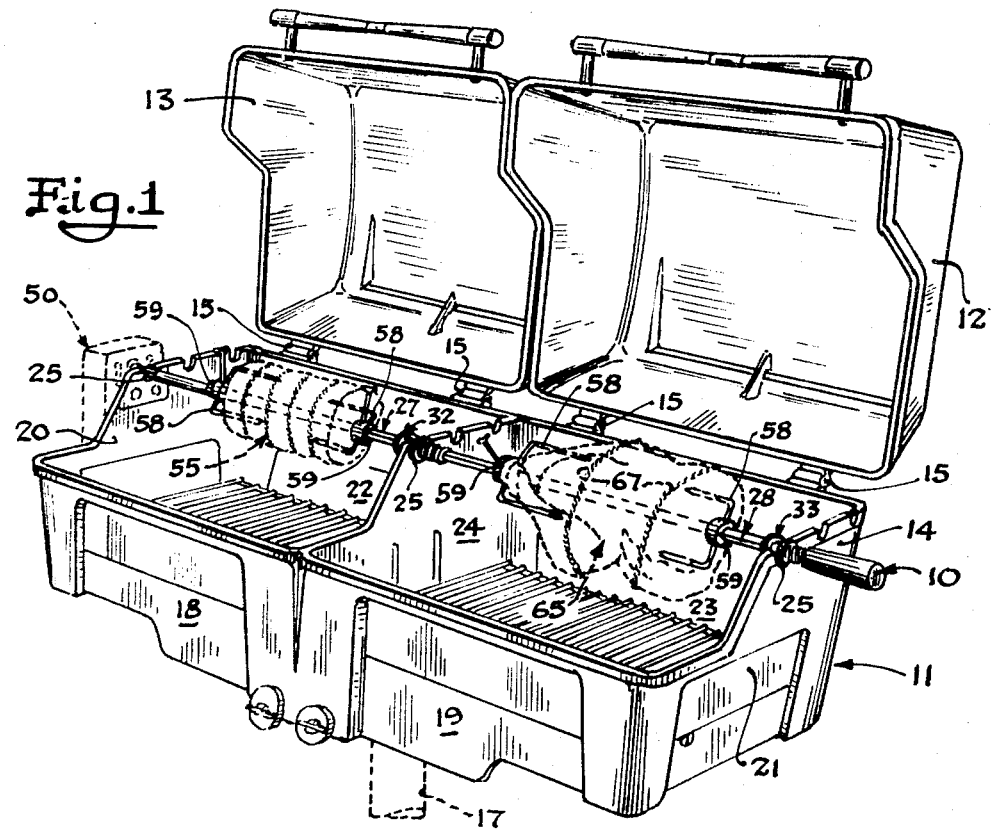
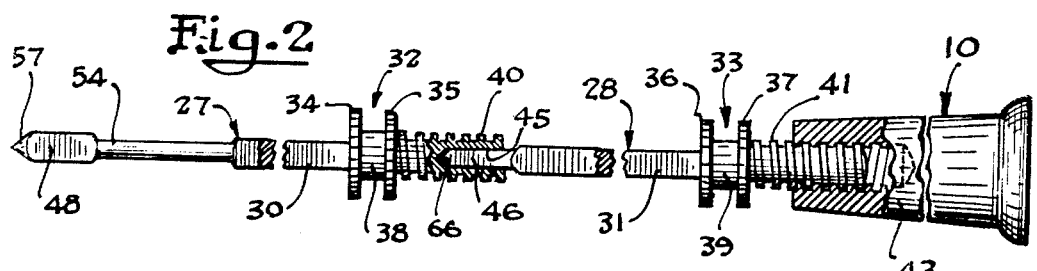
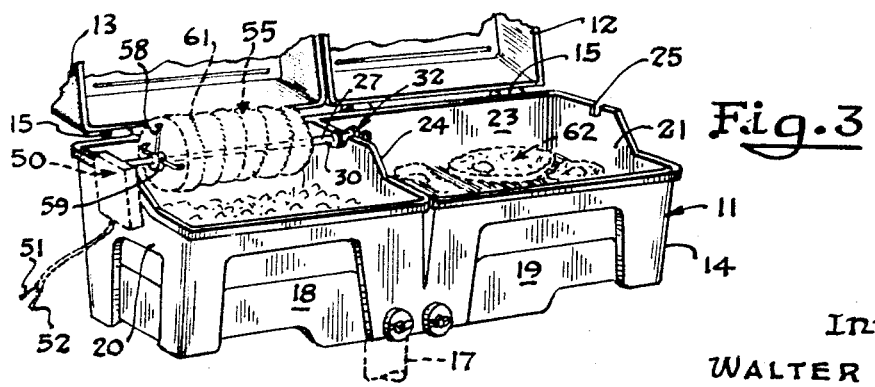
Inventor
WALTER KOZIOL
By Neil E. Hamilton
Attorney

United States Patent Office 3,447,445
Patented June 3, 1969

3,447,445
SPIT ROD ASSEMBLY
Walter Koziol, Russell, Ill., assignor to Charmglow Manufacturing Co., Antioch, Ill., a corporation of Illinois
Filed Dec. 21, 1966, Ser. No. 603,624
Int. Cl. A47j 37/04
U.S. Cl. 99—421                    6 Claims

ABSTRACT OF THE DISCLOSURE

A spit rod assembly with a compartment in one end of one spit rod to receive a projecting member on another spit rod in nonrotatable engagement and the end of the one spit rod opposite the compartment adapted to be driven by a drive means. Bearing members are disposed on both the spit rods to permit rotation thereof on a barbecue unit and external threads are formed on both spit rods to alternately receive handles.

---

The invention relates to power driven spits and more particularly to power driven spits adapted to be interconnected in a barbecue unit.

Power driven spits are disclosed in U.S. Patents 2,211,024 and 3,017,819 wherein several spit rods are driven simultaneously by a power source. U.S. Patent 2,915,002 describes a portable power driven spit wherein spit rod members are threadably attached to form a single rod and the composite rod rotatably supported by a tubular sleeve. The prior art nowhere describes a spit assembly comprised of two parts which can be interconnected without rotation of either part and yet permit one of the spit members to be employed independently of the other.

It is an object of the present invention to provide a novel spid rod assembly wherein at least two spit rod members are interconnected and one of said members is readily operable without the other. It is another object of the present invention to provide a spit assembly wherein at least two spit members engage and disengage each other without rotation of either and yet provide for rotation of both members as a unit. It is still another object of the present invention to provide a novel spit assembly wherein bearing members serve as rotation means for each spit member and also serve to accommodate the assembly in a barbecue unit. It is yet another object of the present invention to provide a spit assembly which will permit a double barbecue unit to operate as a grill on one side and a rotisserie on the other. It is another object of the present invention to provide a novel spit assembly which is readily operable in a barbecue having a supporting median panel.

The foregoing objects are accomplished and the shortcomings of the prior art are overcome by the present spit rod assembly which is comprised of at least two spit rod members interconnected in tandem by means of a compartment in one end of one member and a projection in another member. The compartment and projection are preferably noncircular and in any event form a quick, nonthreadable, nonrotatable connection. External threads are disposed on both spit rod members for alternate engagement with a handle depending upon whether the spit member in direct drive connection with a power source is to be employed alone or whether two or more members are interconnected in tandem. Rotation of each spit member is facilitated by bearings disposed at the inner termination of the external threads and serve to fit in grooves provided in a barbecue unit.

A better understanding of the present spit assembly will be accomplished by reference to the drawing wherein:

FIGURE 1 is a perspective view of a barbecue unit operatively supporting the spit rod assembly in a rotatable manner.

FIURE 2 is a partial view in side elevation and partially in vertical section of the spit rod assembly shown in FIGURE 1 without the roast or turkey placed thereon.

FIGURE 3 is a view like FIGURE 1 but illustrating only a single rod assembly member whereby the barbecue is provided with a rotisserie section on one side and a grill section on the other.

Proceeding to a detailed description of the present invention, the spit rod assembly generally 10 is rotatably supported in a barbecue unit generally 11 having two top cover portions 12 and 13, independently hinged to base portion 14 by hinges 15. Base portion 14 is supported by a post 17 and is composed of front wall sections 18 and 19, opposing end walls 20 and 21, back walls 22 and 23 and a common median wall panel member 24. U-shaped grooves or cutout portions 25 are provided in end walls 20 and 21 and median panel 24 extending inwardly from the upper surfaces to rotatably accommodate spit rod assembly 10 which, as particularly indicated in FIGURE 2, comprises a forward rod assembly generally 27 and a second rod assembly generally 28 interconnected to rod assembly 27 in a tandem relationship. Both rod assemblies 27 and 28 are formed by rod members 30 and 31, respectively, rotatably supporting respective bearings 32 and 33 without longitudinal travel along rods 30 and 31. This is accomplished by providing a reduced diameter section on rods 30 and 31 and then fastening threaded portions 40 and 41 onto the respective rods by force fitting without abutting against the bearings. Circular flanges 34, 35 and 36, 37 on bearings 32 and 33, respectively, are spaced to receive the respective median panel 24 and end wall 21 therebetween with central circular portions 38 and 39 resting in grooves 25 in median panel 24 and end wall 21, respectively. External threaded portions 40 and 41 are disposed at the ends of rod members 30 and 31, respectively, to receive handle 43. A compartment 45, of square cross-sectional dimension, is formed in rod member 30, at the same end as threads 40, to nonrotatably receive a square projection member 46 on the end of rod member 31. Rod members 30 and 31 are essentially the same in design except that in place of the projecting member 46 for engagement with a compartment such as 45, rod member 30 is provided with a square head 48 for drive engagement with an electric motor and drive means generally 50, with power cords 51 and 52. Rod member 30 also has a rounded section 54 to allow rotation of rod member 30 through slot 25 in end wall 20. Pointed head members 57 and 66 are disposed on the ends of rods 30 and 31, respectively, to provide for easy piercing of roast 55 and turkey 65.

Operation

A better understanding of the advantages of spit rod assembly 10 will be had by a description of its operation. A rolled roast 55 is placed on rod member 30 by forcing pointed end 57 therethrough to center roast 55 thereon.

Oppositely disposed forks 58 engage the roast and are held on rod member 30 by round collared screw clamps 59 preferably engaging the square portions of rod member 30. With roast 55 securely positioned on rod member 30 and aided by nonflammable strands 61, square head 48 is inserted into an accommodating drive means (not shown) in motor 50 while round section 54 is orientated across slot 25 in end wall 20, and bearing 32 is placed in slot 25 of median panel 24 with flanges 34 and 35 positioned on opposite sides of the panel allowing rotation of rod member 30 while bearing 32 is held stationary. If only one portion of the barbecue is to be employed as a rotisserie such as shown in FIGURE 3, then rod assembly 27 alone is used, thus leaving the other portion of the barbecue for grilling such as a steak 62. If both portions are desired to be used as rotisseries, then, for example, a turkey such as shown at 65 is speared onto rod 31 by means of point 66 and is held by forks 58 and strands 67 as is described for roast 55. With turkey 65 securely placed on rod member 31, projecting member 46 is placed into compartment 45 of rod assembly 27 and assembly 28 placed so that bearing 33 is orientated in groove 25 of panel 14 with flanges 36 and 37 on opposite sides. Motor 50 will then drive both assemblies 27 and 28 simultaneously by the rotation of rods 30 and 31 in bearings 32 and 33 respectively and the nonrotatable engagement afforded by the engagement of projecting member 46 with compartment 45.

Handle 43 is utilized on threaded portion 41 of assembly 28 when the assemblies are arranged in tandem. When such relationship is not employed, handle 43 also engages threads 40 on rod 30. With bearings 32 and 33 rotatably positioned at the inner ends of threaded portions 40 and 41, the bearings serve as a stop means for handle 43 which is important where the handle is composed of a plastic material and thus subject to splitting if the handle is turned too far inwardly on threads 40 or 41. In addition, bearings 32 and 33 are designed with their respective flanges 34, 35 and 36, 37 spaced so that the lower portions of lids 12 and 13 when resting on the upper edges of panels 21 and 24 will be accommodated therebetween to allow lids 12 and 13 to completely close with the spit rod assembly still being rotatable inside the closed barbecue 11.

In a preferred embodiment of spit rod assembly 10, two rod assemblies 27 and 28 are shown in tandem relationship. If desired, any number of assemblies can be interconnected in tandem by forming a compartment such as 45 in the end of rod 31 opposite a projecting member such as 46 for engagement with a third rod assembly (not shown). Further, while rod assembly 27 is shown with compartment 45 and assembly 28 with projecting member 46, these elements can be alternatively arranged with handle 43 then adapted to receive the projecting member extending beyond the threads (not shown) when it is turned on threads 40. Rounded portion 54 on rod 30 is provided to allow close tolerance through slot 25 in panel 20, but it can be made square like the other portions of the rod.

Compartment 45 and projecting member 46 are illustrated as being square in cross section. However, any nonrotatable interengagement can be employed such as polysided projections and accommodating compartments of the rectangular, triangular, hexagonal or octagonal shapes. Alternatively, a tapered frictional fitting where the compartment and the projection are circular in cross section could also be employed. However, the nonfrictional engagement allows for easier engagement and disengagement.

The preferred material for rod assemblies 27 and 28 as well as forks 58 and clamps 59 is nickel or chrome-plated steel. However, any rigid, nonflammable material can be employed. Handle 43 is composed of a rigid, resinous heat resistor plastic but could alternatively be fabricated from wood or metal or other low heat conductive materials.

It will thus be seen that through the present invention there is now provided a spit rod assembly which can be used as a single spit rod or can be combined with another to form a double rotisserie. In either case, conversion from one to the other form is easily made without removal, turning or otherwise moving the spit rod member which is in direct drive relationship with a drive motor. The novel spit rod assembly is simple in construction yet provides for easy rotation and adaptation on and in any barbecue having wall panels or other similar supports. Further, even though the present spit rod assembly is highly functional, it has an esthetic appearance lending itself to the serving of food and easy cleaning.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A spit rod member adapted to be interconnected with another rod member in tandem relationship comprising: one rod member adapted to be rotated from one end, said one rod member adapted to be readily slidably engaged and disengaged by said other rod member at an end opposite said one rotated end, a compartment and a projecting member for said rod members, respectively, to provide said engagement and disengagement, one of said compartment and projecting members disposed adjacent said end of said one rod member opposite said end adapted to be rotated and a bearing member adjacent one of said compartment and projecting members on said one rod member and rotatably positioned on said rod to rotatably support both said rod members when said other rod member interengages said one rod member.

2. The spit rod assembly as defined in claim 1 wherein said one rod member includes external threaded engagement means, said bearing member rotatably disposed at the inner termination of said thread means and fixed against longitudinal movement whereby said bearing member serves as both a rotation means and a stop for a threaded handle member threadedly receivable on said external threaded engagement means.

3. The spit rod assembly as defined in claim 1 wherein said bearing member is constructed and arranged to be accommodated within a closed barbecue unit, said unit including a cover and a cutout portion in a panel member to engage said bearing member.

4. A barbecue spit rod assembly wherein said spit rod is adapted to be removably supported by a barbecue unit having upstanding panel members and cutout portions extending from the upper surface of said panel members and inwardly therein comprising: a first rod assembly including a first rod member and a flanged rotatable bearing member disposed on said rod member near one end thereof and opposite a driving end, said flanged bearing member adapted to be accommodated by a first said cutout portion to permit rotation of said rod member, a second rod assembly including a second rod member and a flanged rotatable bearing member disposed on said second rod member and adapted to be accommodated by a second said cutout portion, engagement means for said first and second rod members disposed adjacent said flanged bearing member on said first rod member and at an end opposite said flanged bearing member on said second rod member to provide free engagement and disengagement, and means in proximity to said flanged bearing members to receive a handle member.

5. The spit rod assembly as defined in claim 4 wherein said engagement means provided for said rod assemblies is a projection and a compartment on said first and said second rod.

6. The spit rod assembly as defined in claim 5 wherein said means provided in proximity to said engagement means are external threads to receive a handle member.

References Cited

UNITED STATES PATENTS

| | | | |
|---|---|---|---|
| 2,654,307 | 10/1953 | Nisenson | 99—421 |
| 2,809,579 | 10/1957 | Theisen | 99—421 |
| 2,854,918 | 10/1958 | Merritt | 99—421 XR |
| 2,915,002 | 12/1959 | Guhl | 99—421 |
| 3,019,720 | 2/1962 | Topper | 99—339 |
| 3,058,414 | 10/1964 | Armstrong | 99—421 |
| 3,339,478 | 9/1967 | Crow | 99—419 |
| 3,344,736 | 10/1967 | Myler et al. | 99—421 |

WALTER A. SCHEEL, *Primary Examiner.*

ARTHUR O. HENDERSON, *Assistant Examiner.*